US010797630B2

(12) United States Patent
Chen et al.

(10) Patent No.: US 10,797,630 B2
(45) Date of Patent: Oct. 6, 2020

(54) METHOD OF MODULATING CASCADED THREE-PHASE VFD

(71) Applicant: Delta Electronics (Shanghai) CO., LTD, Shanghai (CN)

(72) Inventors: Kai Chen, Shanghai (CN); Wenjiang Zhao, Shanghai (CN); Yongqiang Lang, Shanghai (CN); Peter Mantovanelli Barbosa, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 0 days.

(21) Appl. No.: 16/454,478

(22) Filed: Jun. 27, 2019

(65) Prior Publication Data

US 2020/0007065 A1    Jan. 2, 2020

(30) Foreign Application Priority Data

Jun. 29, 2018  (CN) .......................... 2018 1 0717179

(51) Int. Cl.
*H02P 27/04*    (2016.01)
*H02P 1/26*    (2006.01)

(52) U.S. Cl.
CPC ................ *H02P 27/04* (2013.01); *H02P 1/26* (2013.01)

(58) Field of Classification Search
CPC ......... H02M 7/5395; H02M 2001/007; H02M 2007/4835; H02P 27/14; H02P 21/24; H02P 27/04; H02P 27/08
See application file for complete search history.

(56) References Cited

U.S. PATENT DOCUMENTS

| 9,843,274 B2 * | 12/2017 | Li ......................... H02M 1/083 |
| 9,871,436 B1 * | 1/2018 | Jiao ....................... H02M 7/487 |
| 2006/0245216 A1 * | 11/2006 | Wu ........................ H02M 7/487 363/13 |

(Continued)

FOREIGN PATENT DOCUMENTS

| CN | 1921279 A | 2/2007 |
| CN | 101420185 A | 4/2009 |
| CN | 101615853 A | 12/2009 |

(Continued)

OTHER PUBLICATIONS

The TW1OA issued Jul. 3, 2019 by the TW office.
The CN1OA issued Jun. 3, 2020 by the CNIPA.

*Primary Examiner* — Thai T Dinh
(74) *Attorney, Agent, or Firm* — Yunling Ren

(57) ABSTRACT

A method of modulating a cascaded three-phase VFD, including: obtaining space voltage vectors according to states and output levels of switches of power units in each stage, and dividing the vectors into large vectors, medium vectors, small vectors and zero vectors according to their lengths; arranging the vectors into a vector space, and dividing the vector space into sectors, wherein each sector corresponds to a group of the large vector, the medium vector, the small vector and the zero vector; determining a sector in which a reference voltage vector is located, wherein the reference voltage vector is composed by the group of vectors; calculating action time of the vectors in the group; allocating an action order to the vectors; and generating a three-phase modulated wave signal based on the action orders and the action time.

10 Claims, 11 Drawing Sheets

(56) References Cited

U.S. PATENT DOCUMENTS

2014/0009988 A1* 1/2014 Valiani .............. H02M 7/53875
363/131

FOREIGN PATENT DOCUMENTS

| | | |
|---|---|---|
| CN | 101615860 A | 12/2009 |
| CN | 101814855 A | 8/2010 |
| CN | 102307018 A | 1/2012 |
| CN | 103227580 A | 7/2013 |
| CN | 103888008 A | 6/2014 |
| CN | 103986356 A | 8/2014 |
| CN | 104009702 A | 8/2014 |
| CN | 104682754 A | 6/2015 |
| CN | 104796024 A | 7/2015 |
| CN | 104953911 A | 9/2015 |
| CN | 105024580 A | 11/2015 |
| CN | 105186898 A | 12/2015 |
| CN | 105897027 A | 8/2016 |
| CN | 107302318 A | 10/2017 |
| TW | 365082 B | 7/1999 |
| TW | 201701581 A | 1/2017 |
| TW | 201709666 A | 3/2017 |
| TW | 201801466 A | 1/2018 |

* cited by examiner

METHOD OF MODULATING CASCADED THREE-PHASE VFD

CROSS REFERENCE

This application is based upon and claims priority to Chinese Patent Application No. 201810717179.0, filed on Jun. 29, 2018, and the entire contents thereof are incorporated herein by reference.

TECHNICAL FIELD

The present disclosure relates to the field of power electronic technology, and more particularly, to a method of modulating a cascaded three-phase VFD (Variable-frequency Drive).

BACKGROUND

With the development of power electronics technology, VFDs are widely used in various power electronic systems due to their high efficiency and energy saving. At present, in order to satisfy the demand of high-voltage and high-power power electronic systems, cascaded three-phase VFDs are gradually adopted.

The most common modulation scheme for cascaded VFDs is unipolar frequency doubling modulation. The advantage is that the module outputs PWM waves with voltage of 0 and +1 in the positive half cycles, and outputs PWM waves with voltage of 0 and −1 in the negative half cycles, and the frequency of the module output voltage is double switching frequency of a power device.

FIG. 1 is a circuit diagram of one stage of a cascaded three-phase VFD in the prior art. Referring to FIG. 1, each stage 1000 of the cascaded three-phase VFD includes three power units 100, 200 and 300 to provide corresponding output voltages $U_A$, $U_B$ and $U_C$ for phase A, phase B and phase C. The power unit 100 includes bridge arms Sa1 and Sa2 formed by four switches Ta1, Ta2, Ta3 and Ta4. The power unit 200 and the power unit 300 have the same structure as that of the power unit 100, and respectively include bridge arms Sb1 and Sb2 formed by the switches Tb1, Tb2, Tb3 and Tb4, and bridge arms Sc1 and Sc2 formed by the switches Tc1, Tc2, Tc3 and Tc4. The power unit 100 further includes a DC bus B1, a DC bus capacitor C1 and a plurality of diodes; the power unit 200 further includes a DC bus B2, a DC bus capacitor C2 and a plurality of diodes; and the power unit 300 further includes a DC bus B3, a DC bus capacitor C3 and a plurality of diodes, since the connection relationship thereof is as shown in FIG. 1, it will not be repeatedly described again.

If the space vector modulation method in the prior art is directly used here, only eight basic space voltage vectors are used in operations. As a result, when the states of respective switches in FIG. 1 are switched, several bridge arms may operate simultaneously. If two or three bridge arms are allowed to operate simultaneously, jump of two levels on the output line voltage will occur.

When the VFD is connected to a motor via a long cable, due to the influence from the cable distribution parameters, voltage reflection may occur at the motor end, thereby the motor end may generate overvoltage up to double. The more the number of the jumping levels on the VFD output voltage is, the higher the generated overvoltage on the motor end is, which will accelerate the aging of the motor insulation and shorten the service life of the motor. If a dv/dt filter is used to suppress overvoltage at the motor end, system volume and cost may be increased.

SUMMARY

An object of the present disclosure is to provide a method of modulating a cascaded three-phase VFD, so as to overcome, at least to a certain extent, one or more problems caused by limitation and defects of related technology.

Other features and advantages of the present disclosure will be apparent through the detailed description below, or will be learned partly through the practice of the present disclosure.

According to an aspect of the present disclosure, there is provided a method of modulating a cascaded three-phase VFD, wherein, each stage of the cascaded three-phase VFD includes three power units to provide corresponding output voltages of phase A, phase B and phase C, and the method includes:

In step 1: obtaining a plurality of space voltage vectors according to states and output levels of switches of the power units in each stage, and dividing the plurality of space voltage vectors into large vectors, medium vectors, small vectors and zero vectors according to lengths of the plurality of space voltage vectors;

In step 2, arranging the plurality of space voltage vectors into a vector space, and dividing the vector space into a plurality of sectors by the plurality of space voltage vectors, wherein each of the sector corresponds to a group consisting of the large vector, the medium vector, the small vector and the zero vector;

In step 3, determining a sector in which a reference voltage vector is located, wherein the reference voltage vector is composed by the group consists of the large vector, the medium vector, the small vector and the zero vector, corresponding to the sector;

In step 4, in one switching period, calculating action time of the large vector, action time of the medium vector, action time of the small vector, and action time of the zero vector for synthesizing the reference voltage vector;

In step 5, allocating an action order to the zero vector, the small vector, the medium vector and the large vector;

In step 6, generating a three-phase modulated wave signal based on the action orders and the action time of the large vectors, the medium vectors, the small vectors and the zero vectors; and In step 7, generating switching signals of the power units in the stage according to the generated three-phase modulated wave signals.

In an embodiment, wherein, in the step 1, the power units in each stage have 64 of the states of the switches, and 27 of the space voltage vectors.

In an embodiment, wherein, in the step 1, the 27 space voltage vectors are divided into 6 of the large vectors each having a length of $4/3 U_{dc}$, 6 of the medium vectors each having a length of $$\frac{2\sqrt{3}}{3} U_{dc},$$

12 of the small vectors each having a length of $2/3 U_{dc}$, and 3 of the zero vectors each having a length of 0, wherein the $U_{dc}$ is a DC bus voltage of the power units.

In an embodiment, wherein, in the step 2, the 27 space voltage vectors divide the vector space into 24 sectors, and the vector space is composed of an first hexagon and a second hexagon which are overlapped.

In an embodiment, wherein, in the step 2, the large vectors respectively point to six apexes of the first hexagon, the middle vectors respectively point to midpoints of six sides of the first hexagon, and the small vectors point to six apexes of the second hexagon, wherein the large vectors divide the first hexagon into six large sectors, and the corresponding medium and small vectors divide each large sector into four sectors.

In an embodiment, wherein, in the step 4, in any sector, a formula for synthesizing the reference voltage vector is:

$$\overrightarrow{U_s} = \frac{T_0}{T_s}\overrightarrow{U_0} + \frac{T_1}{T_s}\overrightarrow{U_1} + \frac{T_2}{T_s}\overrightarrow{U_2} + \frac{T_3}{T_s}\overrightarrow{U_3}, \quad (1)$$

wherein, $\overrightarrow{U_s}$ is the reference voltage vector, $\overrightarrow{U_0}$ is the zero vector, $\overrightarrow{U_1}$ is the small vector, $\overrightarrow{U_2}$ is the medium vector, $\overrightarrow{U_3}$ is the large vector, $T_S$ is a switching period of the power units, $T_0$ is the action time of the zero vector, and $T_1$ is the action time of the small vector, $T_2$ is the action time of the medium vector, and $T_3$ is the action time of the large vector, and wherein the action time of the zero vector satisfies:

$$T_0 = T_S - T_1 - T_2 - T_3 \quad (2).$$

In an embodiment, wherein, in the step 4, in any of the large sectors, in two of the sectors within the second hexagon, a constraint condition is set to be that the action time $T_1$ is equal to the action time $T_3$, and in two of the sectors outside the second hexagon, a constraint condition is set that the action time $T_1$ is equal to the action time $T_0$, and the action time $T_0$, $T_1$, $T_2$ and $T_3$ is obtained by calculating according to the sector in which the reference voltage vector is located, the foregoing formulae (1) and (2) and the constraint conditions.

In an embodiment, wherein, in the step 4, in any of the sectors, a constraint condition is set to be that the action time $T_1$ is equal to the action time $T_0$, and the action time $T_0$, $T_1$, $T_2$ and $T_3$ is obtained by calculating according to the sector in which the reference voltage vector is located, the formulae (1) and (2) and the constraint condition.

In an embodiment, wherein, in the step 4, in any of the sectors, a constraint condition is set to be $$T_0 = T_S\left(1 - \frac{\sqrt{3}}{2}\frac{U_{ref\_PK}}{U_{dc}}\right),$$

and the action time $T_0$, $T_1$, $T_2$ and $T_3$ is obtained by calculating according to the sector in which the reference voltage vector $U'_S$ is located, the formulae (1) and (2) and the constraint condition, wherein the $U_{ref\_PK}$ is a peak value of the reference voltage vector, and the $U_{dc}$ is a DC bus voltage of the power units.

In an embodiment, wherein, in the step 5, in each sampling period, the zero vector is used as an initial vector, and any one switching among the large vector, the medium vector, the small vector and the zero vector causes the state of the switches of only one of the output bridge arms to be changed.

For further understanding of the features and technical content of the present disclosure, please refer to the following detailed description and attached drawings of the present disclosure. However, the detailed description and attached drawings are only used to describe the present disclosure and are not intended to restrict the scope of claims of the present disclosure.

BRIEF DESCRIPTION OF THE DRAWINGS

The above and other features and advantages of the present disclosure will become more apparent by referring to the accompanying drawings to describe in detail its exemplary embodiments.

DETAILED DESCRIPTION

Figure 1:
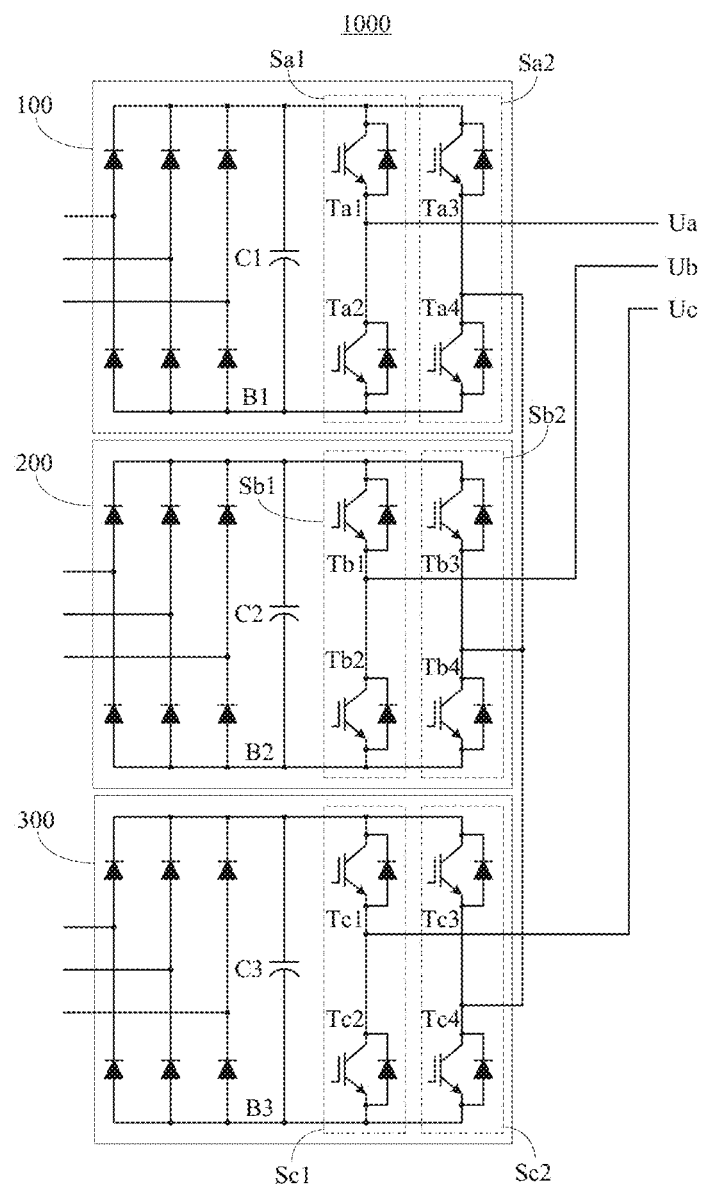
FIG. 1 is a circuit diagram schematically illustrating one stage of a cascaded three-phase VFD according to the related art.

The exemplary embodiments will now be described more fully with reference to the accompanying drawings. However, the exemplary embodiments can be implemented in a variety of forms and should not be construed as limited to the embodiments set forth herein. Rather, the embodiments are provided so that the present disclosure will be thorough and complete and will fully convey the concepts of exemplary embodiments to those skilled in the art. The same reference numerals in the drawings denote the same or similar parts, and thus repeated description thereof will be omitted.

In addition, the features, structures or characteristics described may be combined in one or more embodiments in any suitable manner. In the following description, numerous specific details are provided to give a full understanding of the embodiments of the present disclosure. However, those skilled in the art will recognize that the technical solution of the present disclosure may be practiced without one or more of the specific details described, or that other structures, steps, methods, components, materials, etc. may be employed. In other instances, well-known technical solutions are not shown or described in detail to avoid obscuring aspects of the present disclosure.

The present disclosure will be described in detail below in combination with FIG. 1 to FIG. 11, wherein, if there is an intersection between the line segments as the connecting wires, a black dot "•" at the intersection indicates that the intersection is a connection point, and the absence of a black dot "•" at the intersection indicates that the intersection is not a connecting point but merely a crossing. The symbols of the various elements represent not only the elements themselves but also algebraic symbols of the capacity of the elements.

Figure 2:
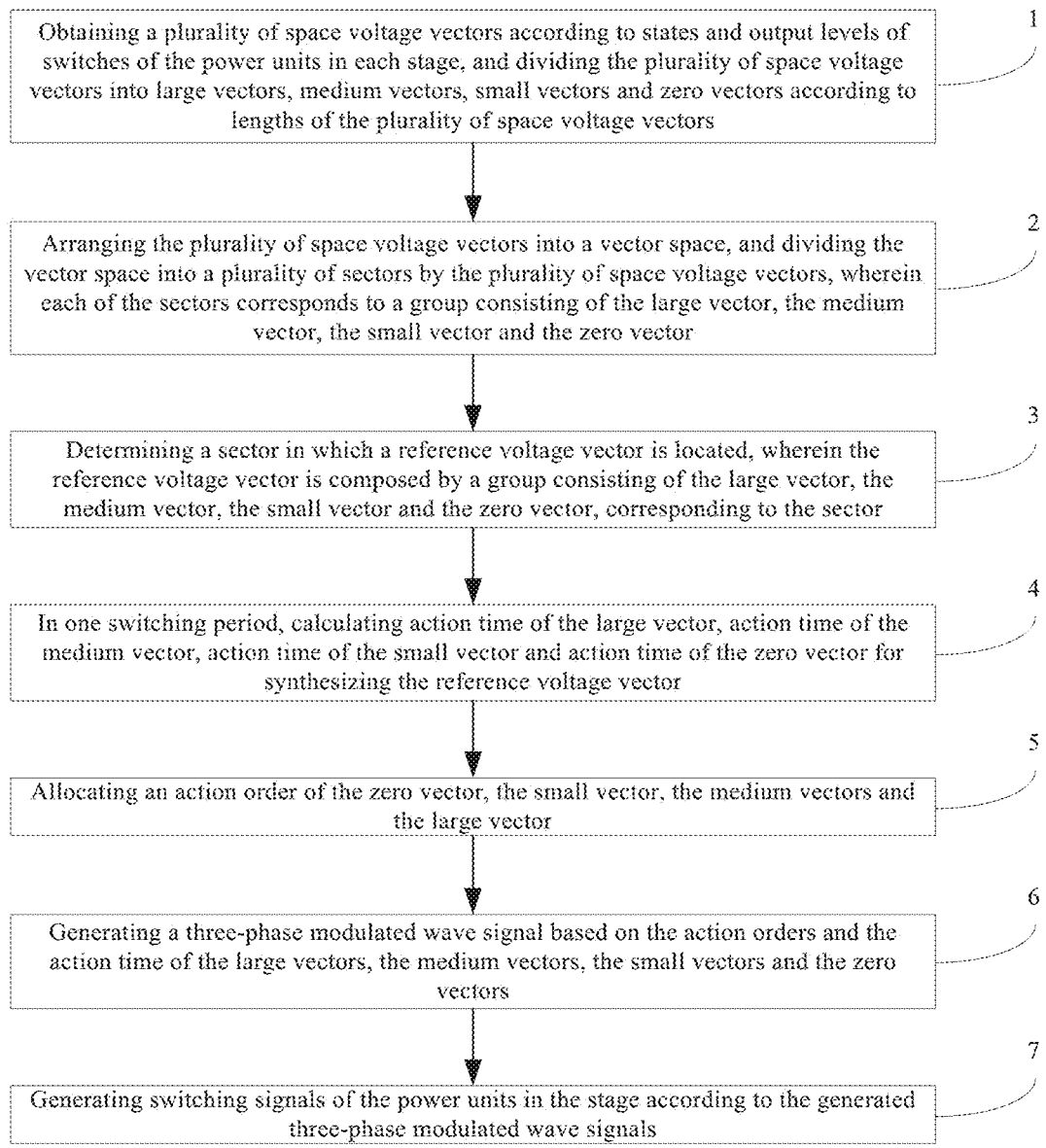
FIG. 2 is a flow chart schematically illustrating a method of modulating a cascaded three-phase VFD according to an exemplary embodiment of the present disclosure.

At first, referring to FIG. 2, FIG. 2 is a flow chart schematically illustrating a method of modulating a cascaded three-phase VFD according to an exemplary embodiment of the present disclosure. As shown in FIG. 2, the method of modulating the cascade three-phase VFD of the present invention can be applied to the cascade three-phase VFD shown in FIG. 1. The method includes the following steps.

In step 1, a plurality of space voltage vectors are obtained according to the states and output levels of the switches Ta1, Ta2, Ta3, Ta4, Tb1, Tb2, Tb3, Tb4, Tc1, Tc2, Tc3 and Tc4 of the power units 100, 200 and 300 in each stage 1000, and then the plurality of space voltage vectors are divided into large vectors, medium vectors, small vectors and zero vectors according to the lengths of the plurality of space voltage vectors.

Taking the power unit 100 as an example, the relationship between the states and output levels of the bridge arms Sa1 and Sa2 formed by the switches Ta1, Ta2, Ta3, and Ta4 is shown in Table 1.

TABLE 1

| Output level | Switch state of the bridge arm Sa1 | Switch state of the bridge arm Sa2 |
|---|---|---|
| 0 | 0 | 0 |
| −1 | 0 | 1 |
| 1 | 1 | 0 |
| 0 | 1 | 1 |

The space voltage vector distribution is obtained according to the states and output levels of the switches Ta1, Ta2, Ta3, Ta4, Tb1, Tb2, Tb3, Tb4, Tc1, Tc2, Tc3 and Tc4. These switches form the six bridge arms Sa1, Sa2, Sb1, Sb2, Sc1 and Sc2 of the three power units 100, 200 and 300 in each stage 1000 of the cascaded three-phase VFD shown in FIG. 1. As shown in Table 2 and FIG. 3, these space voltage vectors are divided into large vectors, medium vectors, small vectors and zero vectors according to their lengths.

As an embodiment, in step 1, the three power units 100, 200 and 300 in each stage 1000 have a total of 64 states of switches (or states of bridge arms). The 64 switch combination functions generate 27 space voltage vectors.

TABLE 2

| Vector type | State of switches, i.e. switch function | | Voltage vector | Length | Spatial position |
|---|---|---|---|---|---|
| Large vector | 10,01,01 01,10,01 | 10,10,01 01,10,10 | -1-1-1, 11-1, -11-1, -111, -1-11, 1-11 | $\frac{4}{3}U_{dc}$ | Apex of exterior regular hexagon |
| Media vector | 10,00,01 00,10,01 01,10,00 01,00,10 00,01,10 10,01,00 | 10,11,01 11,10,01 01,10,11 01,11,10 11,01,10 10,01,11 | 10-1, 01-1, -110, -101, 0-11, 1-10 | $\frac{2\sqrt{3}}{3}U_{dc}$ | Midpoint of each side of exterior regular hexagon |
| Small vector | 00,01,01 10,00,00 10,11,00 10,10,11 00,00,01 11,00,01 01,00,01 00,10,00 11,00,00 00,10,10 01,00,00 01,11,00 01,00,10 00,01,10 11,00,10 10,00,10 00,01,00 11,01,00 | 11,01,01 10,00,11 10,10,11 10,10,00 00,11,01 11,11,01 01,11,00 00,10,11 11,10,11 11,10,10 01,00,11 01,11,11 01,01,11 00,11,10 11,11,10 10,11,10 00,01,11 11,01,11 | 100, 0-1-1, 00-1, 100, -10-1, 010, 011, -100, -1-10, 001, 0-10, 101 | $\frac{2}{3}U_{dc}$ | Apex of interior regular hexagon |
| Zero vector | 00,00,00 00,11,00 11,00,00 11,11,00 10,10,10 | 00,00,11 00,11,11 11,00,11 11,11,11 01,01,01 | 111, 000, -1-1-1 | 0 | Coordinate origin |

As an embodiment, in step 1, the 27 space voltage vectors are divided into 6 large vectors with a length of 4/3U$_{dc}$, 6 medium vectors with a length of $$\frac{2\sqrt{3}}{3}U_{dc},$$

12 small vectors with a length of 2/3U$_{dc}$, and 3 zero vectors with a length of 0, as shown in Table 2. The U$_{dc}$ in Table 2 is the DC bus voltages of the DC buses B1, B2, and B3 of the power units 100, 200 and 300, and the three DC bus voltages are substantially the same.

Figure 3:
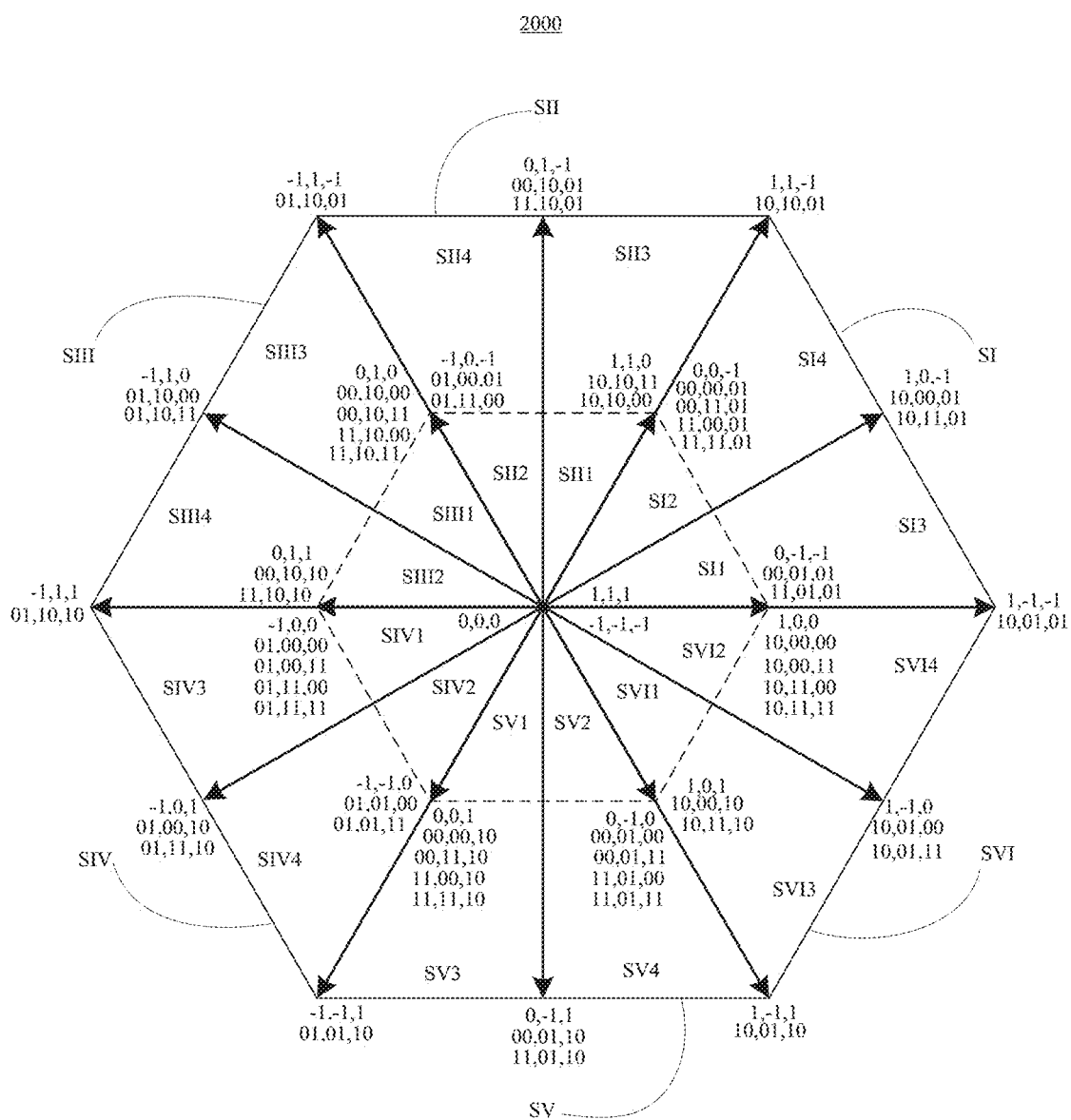
FIG. 3 is a schematic diagram illustrating a vector space of the present disclosure.

FIG. 3 is a schematic diagram illustrating a vector space of the present disclosure. Referring to FIG. 3, in step 2 of the present disclosure, the plurality of space voltage vectors (27 space voltage vectors) shown in Table 2 are arranged into the vector space 2000, and the vector space 2000 is divided into a plurality of sectors SI1, SI2, SI3, SI4, SII1, SII2, SII3, SII4, SIII1, SIII2, SIII3, SIII4, SIV1, SIV2, SIV3, SIV4, SV1, SV2, SV3, SV4, SVI1, SVI2, SVI3 and SVI4 by these space voltage vectors. Each of the sectors corresponds to a group consisting of a large vector, a medium vector, a small vector and a zero vector. For example, each of the sectors SI1, SI2, SI3, and SI4 corresponds to a group consisting of a large vector (1, −1, −1), a medium vector (1, 0, −1), a small vector (0, −1, −1) and a zero vectors (1, 1, 1).

As an embodiment, in step 2, the 27 space voltage vectors divide the vector space 2000 into 24 sectors SI1, SI2, SI3, SI4, SII1, SII2, SII3, SII4, SIII1, SIII2, SIII3, SIII4, SIV1, SIV2, SIV3, SIV4, SV1, SV2, SV3, SV4, SVI1, SVI2, SVI3 and SVI4, and the vector space 2000 is composed of a first hexagon (i.e., the exterior regular hexagon mentioned in Table 2), and a second hexagon (the interior regular hexagon mentioned in Table 2), which are overlapped, as shown by the dotted line in FIG. 3. The exterior regular hexagon has the area occupied by all the sectors, and the interior regular hexagon only has the area occupied by the sectors SI1, SI2, SII1, SII2, SIII1, SIII2, SIV1, SIV2, SV1, SV2, SVI1 and SVI2.

In other words, as an embodiment, in step 2, the large vectors respectively point to the six apexes of the exterior regular hexagon, and the middle vectors respectively point to the midpoint of the six sides of the exterior regular hexagon, and the vectors in the large vectors point to the six apexes of the interior regular hexagon. Further, the large vectors divide the exterior regular hexagon into six large sectors SI, SII, SIII, SIV, SV and SVI, and the corresponding medium vectors and the corresponding small vectors divide each large sector into four sectors. Specifically, the first large sector SI is divided into four sectors SI1, SI2, SI3 and SI4; the second large sector SII is divided into four sectors SII1, SII2, SII3 and SII4; the third large sector SIII is divided into four sectors SIII1, SIII2, SIII3 and SIII4; the fourth large sector SIV is divided into four sectors SIV1, SIV2, SIV3 and SIV4; the fifth large sector SV is divided into four sectors SV1, SV2, SV3 and SV4; and the sixth large sector SVI is divided into four sectors SVI1, SVI2, SVI3 and SVI4.

Step 3 and step 4 will be described below with reference to FIG. 4 and FIG. 5.

According to the three-phase AC theory, the whole function of the output voltage of a three-phase AC is equivalent to a rotating voltage vector. The rotating voltage vector can be regarded as a control target, which is called a reference voltage vector $\vec{U}_s$ here.

In step 3, a sector, in which the reference voltage vector $\vec{U}_s$ is located, is determined, wherein the reference voltage vector U'$_s$ can be composed by a group consisting of a large vector $\vec{U}_3$, a medium vector $\vec{U}_2$, a small vector $\vec{U}_1$ and a zero vector $\vec{U}_0$, corresponding to the sector in which the reference voltage vector $\vec{U}_s$ is located.

Figure 4:
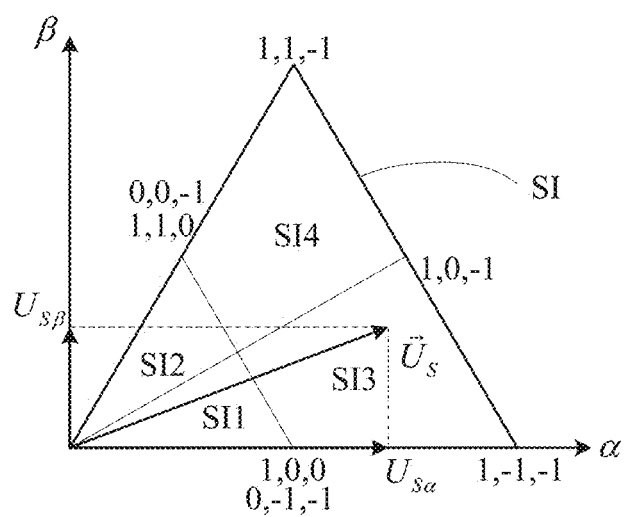
FIG. 4 is a schematic diagram schematically illustrating determination of a sector in which a reference voltage vector of the present disclosure is located.

FIG. 4 is a schematic diagram schematically illustrating determination of a sector in which a reference voltage vector of the present disclosure is located. Referring to FIG. 4, the large sector SI is taken as an example. Then $\vec{U}_s$ is the control target, i.e., the reference voltage vector, the amplitude of which represents the amplitude of a phase voltage, and the rotation angular velocity is the angular frequency of an output sinusoidal voltage. $U_{s\alpha}$ is the component of $\vec{U}_s$ on the α-axis, and $U_{s\beta}$ is the component of $\vec{U}_s$ on the β axis. Based on geometrical analysis, in an αβ rectangular coordinate system, the condition that the reference voltage vector $\vec{U}_s$ is located in the large sector SI is:

$$\begin{cases} U_{s\beta} \geq 0 \\ \frac{\sqrt{3}}{2} U_{s\alpha} - \frac{1}{2} U_{s\beta} \geq 0 \\ -\frac{\sqrt{3}}{2} U_{s\alpha} - \frac{1}{2} U_{s\beta} \leq 0 \end{cases}.$$

Similarly, the determination formulae of the conditions that the reference voltage vector $\vec{U}_s$ is located in other large sectors can be obtained, as shown in Table 3.

TABLE 3

| Sector SI | $U_{s\beta} \geq 0$ & $\frac{\sqrt{3}}{2} U_{s\alpha} - \frac{1}{2} U_{s\beta} \geq 0$ & $-\frac{\sqrt{3}}{2} U_{s\alpha} - \frac{1}{2} U_{s\beta} \leq 0$ |
|---|---|
| Sector SII | $U_{s\beta} \geq 0$ & $\frac{\sqrt{3}}{2} U_{s\alpha} - \frac{1}{2} U_{s\beta} \leq 0$ & $-\frac{\sqrt{3}}{2} U_{s\alpha} - \frac{1}{2} U_{s\beta} \leq 0$ |
| Sector SIII | $U_{s\beta} \geq 0$ & $\frac{\sqrt{3}}{2} U_{s\alpha} - \frac{1}{2} U_{s\beta} \leq 0$ & $-\frac{\sqrt{3}}{2} U_{s\alpha} - \frac{1}{2} U_{s\beta} \geq 0$ |
| Sector SIV | $U_{s\beta} \leq 0$ & $\frac{\sqrt{3}}{2} U_{s\alpha} - \frac{1}{2} U_{s\beta} \leq 0$ & $-\frac{\sqrt{3}}{2} U_{s\alpha} - \frac{1}{2} U_{s\beta} \geq 0$ |
| Sector SV | $U_{s\beta} \leq 0$ & $\frac{\sqrt{3}}{2} U_{s\alpha} - \frac{1}{2} U_{s\beta} \geq 0$ & $-\frac{\sqrt{3}}{2} U_{s\alpha} - \frac{1}{2} U_{s\beta} \geq 0$ |
| Sector SVI | $U_{s\beta} \leq 0$ & $\frac{\sqrt{3}}{2} U_{s\alpha} - \frac{1}{2} U_{s\beta} \geq 0$ & $-\frac{\sqrt{3}}{2} U_{s\alpha} - \frac{1}{2} U_{s\beta} \leq 0$ |

After the large sector in which the reference voltage vector U'$_s$ is located is determined, based on the geometrical analysis as well, a determination formula of the condition that the reference voltage vector $\vec{U}_s$ is located in a sector within the large sector can be obtained. The sector SI1 in the large sector SI is taken as an example, then the condition that the reference voltage vector U'$_s$ is located in the sector SI1 is:

$$\begin{cases} \frac{1}{2} U_{s\alpha} - \frac{\sqrt{3}}{2} U_{s\beta} > 0 \\ \frac{\sqrt{3}}{2} U_{s\alpha} + \frac{1}{2} U_{s\beta} - \frac{1}{\sqrt{3}} \cdot \frac{U_{dc}}{2} \leq 0 \end{cases}$$

As described above, $U_{dc}$ is the DC bus voltages of the DC buses B1, B2 and B3 of the power units 100, 200 and 300.

Similarly, the determination formulae of the conditions that the reference voltage vector $\vec{U}_s$ is located in other sectors can be obtained, as shown in Table 4.

TABLE 4

| | | |
|---|---|---|
| Sector SI | Sector SI1 | $U_{r4} > 0$ & $U_{r7} \leq 0$ |
| | Sector SI3 | $U_{r4} > 0$ & $U_{r7} > 0$ |
| | Sector SI2 | $U_{r4} \leq 0$ & $U_{r7} \leq 0$ |
| | Sector SI4 | $U_{r4} \leq 0$ & $U_{r7} > 0$ |
| Sector SII | Sector SII1 | $U_{r5} > 0$ & $U_{r11} \leq 0$ |
| | Sector SII3 | $U_{r5} > 0$ & $U_{r11} > 0$ |
| | Sector SII2 | $U_{r5} \leq 0$ & $U_{r11} \leq 0$ |
| | Sector SII4 | $U_{r5} \leq 0$ & $U_{r11} > 0$ |
| Sector SIII | Sector SIII1 | $U_{r6} > 0$ & $U_{r8} \geq 0$ |
| | Sector SIII3 | $U_{r6} > 0$ & $U_{r8} < 0$ |
| | Sector SIII2 | $U_{r6} \leq 0$ & $U_{r8} \geq 0$ |
| | Sector SIII4 | $U_{r6} \leq 0$ & $U_{r8} < 0$ |
| Sector SIV | Sector SIV1 | $U_{r4} < 0$ & $U_{r12} \geq 0$ |
| | Sector SIV3 | $U_{r4} < 0$ & $U_{r12} < 0$ |
| | Sector SIV2 | $U_{r4} \geq 0$ & $U_{r12} \geq 0$ |
| | Sector SIV4 | $U_{r4} \geq 0$ & $U_{r12} < 0$ |
| Sector SV | Sector SV1 | $U_{r5} < 0$ & $U_{r9} \geq 0$ |
| | Sector SV3 | $U_{r5} < 0$ & $U_{r9} < 0$ |
| | Sector SV2 | $U_{r5} \geq 0$ & $U_{r9} \geq 0$ |
| | Sector SV4 | $U_{r5} \geq 0$ & $U_{r9} < 0$ |
| Sector SVI | Sector SVI1 | $U_{r6} < 0$ & $U_{r10} \leq 0$ |
| | Sector SVI3 | $U_{r6} < 0$ & $U_{r10} > 0$ |
| | Sector SVI2 | $U_{r6} \geq 0$ & $U_{r10} \leq 0$ |
| | Sector SVI4 | $U_{r6} \geq 0$ & $U_{r10} > 0$ | wherein, $$U_{r4} = \frac{1}{2}U_{s\alpha} - \frac{\sqrt{3}}{2}U_{s\beta}$$

$$U_{r5} = U_{s\alpha}$$

$$U_{r6} = \frac{1}{2}U_{s\alpha} + \frac{\sqrt{3}}{2}U_{s\beta}$$

$$U_{r7} = \frac{\sqrt{3}}{2}U_{s\alpha} + \frac{1}{2}U_{s\beta} - \frac{U_{dc}}{\sqrt{3}}$$

$$U_{r8} = \frac{\sqrt{3}}{2}U_{s\alpha} - \frac{1}{2}U_{s\beta} + \frac{U_{dc}}{\sqrt{3}}$$

$$U_{r9} = U_{s\beta} + \frac{U_{dc}}{\sqrt{3}}$$

$$U_{r10} = \frac{\sqrt{3}}{2}U_{s\alpha} - \frac{1}{2}U_{s\beta} - \frac{U_{dc}}{\sqrt{3}}$$

$$U_{r11} = U_{s\beta} - \frac{U_{dc}}{\sqrt{3}}$$

$$U_{r12} = \frac{\sqrt{3}}{2}U_{s\alpha} + \frac{1}{2}U_{s\beta} + \frac{U_{dc}}{\sqrt{3}}.$$

Figure 5:
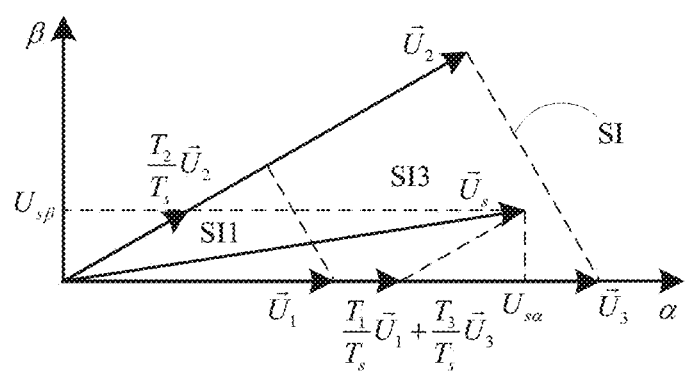
FIG. 5 is a schematic diagram illustrating synthesis of a reference voltage vector of the present disclosure.

FIG. 5 is a schematic diagram illustrating synthesis of a reference voltage vector of the present disclosure. Referring to FIG. 5, for example, the reference voltage vector $\vec{U}_s$ located in the sector SI3 can be composed by the group consisting of a large vector $\vec{U}_3$, a medium vector $\vec{U}_2$, a small vector $\vec{U}_1$ and a zero vector $\vec{U}_0$. That is to say, the group consisting of a large vector $\vec{U}_3$, a medium vector $\vec{U}_2$, a small vector $\vec{U}_1$ and a zero vector $U'_0$ corresponds to the sector SI3. $T_S$ is a switching period of three power units 100, 200 and 300 in each stage 1000 of the cascaded three-phase VFD shown in FIG. 1, $T_0$ is an action time of the zero vector $\vec{U}_0$, $T_1$ is an action time of the small vector $\vec{U}_1$, $T_2$ is an action time of the medium vector $\vec{U}_2$, and $T_3$ is an action time of the large vector $\vec{U}_3$.

In step 4, in one switching period $T_S$, the action time $T_3$ of the large vector $\vec{U}_3$, the action time $T_2$ of the medium vector $\vec{U}_2$, the action time $T_1$ of the small vector $\vec{U}_1$, and the action time $T_0$ of the zero vector $\vec{U}_0$ used for synthesizing the reference voltage vector $\vec{U}_s$ are calculated.

Still referring to FIG. 4 and FIG. 5, the sector SI3 in the large sector SI is taken as an example, the action time of the small vector $\vec{U}_1$ (1, 0, 0), the medium vector $\vec{U}_2$ (1, 0, −1) and the large vector $\vec{U}_3$ (1, −1, −1) respectively is $T_1$, $T_2$ and $T_3$. According to the parallelogram rule of vector operation, there is:

$$\vec{U}_s = \frac{T_1}{T_s}\vec{U}_1 + \frac{T_2}{T_s}\vec{U}_2 + \frac{T_3}{T_s}\vec{U}_3.$$

If the zero vector $\vec{U}_0$ is introduced, the action time of the zero vector $\vec{U}_0$ is $T_0$, then, as an embodiment, in step 4, in any sector, the formula for synthesizing the reference voltage vector $\vec{U}_s$ is:

$$\vec{U}_s = \frac{T_0}{T_s}\vec{U}_0 + \frac{T_1}{T_s}\vec{U}_1 + \frac{T_2}{T_s}\vec{U}_2 + \frac{T_3}{T_s}\vec{U}_3. \quad (1)$$

wherein, $\vec{U}_s$ is the reference voltage vector, $\vec{U}_0$ is the zero vector, $\vec{U}_1$ is the small vector, $U'_2$ is the medium vector, and $\vec{U}_3$ is the large vector, $T_S$ is the switching period of three power units 100, 200 and 300 in each stage 1000 of the cascaded three-phase VFD shown in FIG. 1, $T_0$ is the action time of the zero vector $\vec{U}_0$, $T_1$ is the action time of the small vector $\vec{U}_1$, $T_2$ is the action time of the medium vector $\vec{U}_2$, and $T_3$ is the action time of the large vector $\vec{U}_3$, wherein the action time $T_0$ of the zero vector $\vec{U}_0$ satisfies the following formula (2).

$$T_0 = T_S - T_1 - T_2 - T_3 \quad (2).$$

The reference voltage vector $U'_S$ can be decomposed in the αβ rectangular coordinate system to obtain the following formulae:

$$\begin{cases} U_{s\alpha} = \frac{T_1}{T_s}|\vec{U}_1| + \frac{T_2}{T_s}|\vec{U}_2|\cos 30° + \frac{T_3}{T_s}|\vec{U}_3| \\ U_{s\beta} = \frac{T_2}{T_s}|\vec{U}_2|\sin 30° \end{cases}.$$

Although there are four unknown variables, the present disclosure can calculate these four variables by adding a constraint condition of $T_0$, $T_1$, $T_2$, $T_3$ and $T_4$.

As three embodiments of the present disclosure, the following three schemes for allocating action time of the space voltage vectors are provided.

Scheme 1

As an embodiment, in step 4, in any of the large sectors, in the two sectors within the interior regular hexagon, the constraint condition is set to be that the action time $T_1$ of the small vector $\vec{U}_1$ is equal to the action time $T_3$ of the large vector $\vec{U}_3$, and in the two sectors outside the exterior regular hexagon, the constraint condition is set to be that the action time $T_1$ of the small vector $\vec{U}_1$ is equal to the action time $T_0$ of the zero vector $U'_0$. Then the action time $T_0$ of the zero vector $U'_0$, the action time $T_1$ of the small vector $U'_1$, the action time $T_2$ of the medium vector $U'_2$ and the action time $T_3$ of the large vector $U'_3$ are calculated according to the sector in which the reference voltage vector $U'_S$ is located, the foregoing formulae (1) and (2), and the constraint conditions of this embodiment.

The formula of the constraint condition is, $$T_1 = \begin{cases} T_3, & \text{sector 1 \& 2} \\ (T_s - T_2 - T_3)/2, & \text{sector 3 \& 4} \end{cases}.$$

Due to $|\vec{U}_1|=2U_d/3$, $|\vec{U}_2|=2U_d/\sqrt{3}$, and $|\vec{U}_3|=4U_d/3$, the action time $T_0$ of the zero vector $\vec{U}_0$, the action time $T_1$ of the small vector $\vec{U}_1$, the action time $T_2$ of the medium vector $\vec{U}_2$ and the action time $T_3$ of the large vector $\vec{U}_3$ are solved respectively to be:

$$\begin{cases} T_0 = T_1 = \dfrac{T_s - T_2 - T_3}{2} \\ T_2 = \dfrac{\sqrt{3}\, T_s U_{s\beta}}{U_d} \\ T_3 = \dfrac{T_s}{U_d}\left(U_{s\alpha} - \dfrac{2}{\sqrt{3}} U_{s\beta}\right) - \dfrac{T_s}{3} \end{cases}.$$

Scheme 2

As an embodiment, in step 4, in any of the sectors, the constraint condition is set to be that the action time $T_0$ of the zero vector $\vec{U}_0$ is equal to the action time $T_1$ of the small vector $U'_1$. Then the action time $T_0$ of the zero vector $U'_0$, the action time $T_1$ of the small vector $U'_1$, the action time $T_2$ of the medium vector $U'_2$ and the action time $T_3$ of the large vector $\vec{U}_3$ are calculated according to the sector in which the reference voltage vector $\vec{U}_S$ is located, the foregoing formulae (1) and (2), and the constraint conditions of this embodiment.

The formula of the constraint condition is, $T_1 = (T_s - T_2 - T_3)/2$.

The reference voltage vector $\vec{U}_S$ is decomposed in the αβ rectangular coordinate system to obtain the following formulae.

$$\begin{cases} U_{s\alpha} = \dfrac{T_1}{T_s}|\vec{U}_1| + \dfrac{T_2}{T_s}|\vec{U}_2|\cos 30° + \dfrac{T_3}{T_s}|\vec{U}_3| \\ U_{s\beta} = \dfrac{T_2}{T_s}|\vec{U}_2|\sin 30° \end{cases}.$$

The action time $T_0$ of the zero vector $U'_0$, the action time $T_1$ of the small vector $U'_1$, the action time $T_2$ of the medium vector $U'_2$ and the action time $T_3$ of the large vector $\vec{U}_3$ are solved respectively to be:

$$\begin{cases} T_0 = T_1 = \dfrac{T_s - T_2 - T_3}{2} \\ T_2 = \dfrac{\sqrt{3}\, T_s U_{s\beta}}{U_d} \\ T_3 = \dfrac{T_s}{U_d}\left(U_{s\alpha} - \dfrac{2}{\sqrt{3}} U_{s\beta}\right) - \dfrac{T_s}{3} \end{cases}.$$

Scheme 3

As an embodiment, in step 4, in any of the sectors, the constraint condition is set to be $$T_0 = T_S\left(1 - \dfrac{\sqrt{3}}{2}\dfrac{U_{ref\_PK}}{U_{dc}}\right).$$

Then the action time $T_0$ of the zero vector $\vec{U}_0$, the action time $T_1$ of the small vector $\vec{U}_1$, the action time $T_2$ of the medium vector $\vec{U}_2$ and the action time $T_3$ of the large vector $U'_3$ are calculated according to the sector in which the reference voltage vector $\vec{U}_S$ is located, the foregoing formulae (1) and (2), and the constraint conditions of this embodiment. $U_{ref\_PK}$ is the peak value of the reference voltage vector $\vec{U}_S$, and $U_{dc}$ is the DC bus voltage of the DC buses B1, B2 and B3 of power units 100, 200 and 300.

The reference voltage vector $\vec{U}_S$ is decomposed in the αβ rectangular coordinate system to obtain the following formulae.

$$\begin{cases} U_{s\alpha} = \dfrac{T_1}{T_s}|\vec{U}_1| + \dfrac{T_2}{T_s}|\vec{U}_2|\cos 30° + \dfrac{T_3}{T_s}|\vec{U}_3| \\ U_{s\beta} = \dfrac{T_2}{T_s}|\vec{U}_2|\sin 30° \end{cases}.$$

The action time $T_0$ of the zero vector $\vec{U}_0$, the action time $T_1$ of the small vector $\vec{U}_1$, the action time $T_2$ of the medium vector $\vec{U}_2$ and the action time $T_3$ of the large vector $\vec{U}_3$ are solved respectively to be:

$$\begin{cases} T_1 = \dfrac{T_s - T_2 - T_3}{2} \\ T_2 = \dfrac{\sqrt{3}\, T_s U_{s\beta}}{U_d} \\ T_3 = \dfrac{T_s}{U_d}\left(U_{s\alpha} - \dfrac{2}{\sqrt{3}} U_{s\beta}\right) - \dfrac{T_s}{3} \end{cases}.$$

As an example, Table 5 shows the action time of the space voltage vectors in all sectors calculated based on the above scheme 1 for allocating action time of the space voltage vector. Through table 5, as long as the sector in which the reference voltage vector $\vec{U}_S$ is located is determined, the action time of the corresponding space voltage vectors can be obtained.

TABLE 5

| Sector | | $T_0$ | $T_1$ | $T_2$ | $T_3$ |
|---|---|---|---|---|---|
| I | 1 | $T_s - T_1 - T_2 - T_3$ | $T_3$ | $\dfrac{\sqrt{3}\, T_S U_{s\beta}}{U_d}$ | $\dfrac{T_s}{U_d}\left(\dfrac{1}{2}U_{s\alpha} - \dfrac{\sqrt{3}}{2}U_{s\beta}\right)$ |

TABLE 5-continued

| Sector | | $T_0$ | $T_1$ | $T_2$ | $T_3$ |
|---|---|---|---|---|---|
| | 2 | $T_s - T_1 - T_2 - T_3$ | $T_3$ | $\dfrac{T_s}{U_d}\left(\dfrac{3}{2}U_{s\alpha} - \dfrac{\sqrt{3}}{2}U_{s\beta}\right)$ | $-\dfrac{T_s}{U_d}\left(\dfrac{1}{2}U_{s\alpha} - \dfrac{\sqrt{3}}{2}U_{s\beta}\right)$ |
| | 3 | $\dfrac{T_s - T_2 - T_3}{2}$ | $\dfrac{T_s - T_2 - T_3}{2}$ | $\dfrac{\sqrt{3}\,T_s U_{s\beta}}{U_d}$ | $\dfrac{T_s}{U_d}\left(U_{s\alpha} - \dfrac{2}{\sqrt{3}}U_{s\beta}\right) - \dfrac{T_s}{3}$ |
| | 4 | $\dfrac{T_s - T_2 - T_3}{2}$ | $\dfrac{T_s - T_2 - T_3}{2}$ | $\dfrac{T_s}{U_d}\left(\dfrac{3}{2}U_{s\alpha} - \dfrac{\sqrt{3}}{2}U_{s\beta}\right)$ | $\dfrac{T_s}{U_d}\left(-\dfrac{1}{2}U_{s\alpha} + \dfrac{5\sqrt{3}}{6}U_{s\beta}\right) - \dfrac{T_s}{3}$ |
| II | 1 | $T_s - T_1 - T_2 - T_3$ | $T_3$ | $\dfrac{T_s}{U_d}\left(-\dfrac{3}{2}U_{s\alpha} + \dfrac{\sqrt{3}}{2}U_{s\beta}\right)$ | $\dfrac{T_s U_{s\alpha}}{U_d}$ |
| | 2 | $T_s - T_1 - T_2 - T_3$ | $T_3$ | $\dfrac{T_s}{U_d}\left(\dfrac{3}{2}U_{s\alpha} + \dfrac{\sqrt{3}}{2}U_{s\beta}\right)$ | $-\dfrac{T_s U_{s\alpha}}{U_d}$ |
| | 3 | $\dfrac{T_s - T_2 - T_3}{2}$ | $\dfrac{T_s - T_2 - T_3}{2}$ | $\dfrac{T_s}{U_d}\left(-\dfrac{3}{2}U_{s\alpha} + \dfrac{\sqrt{3}}{2}U_{s\beta}\right)$ | $-\dfrac{T_s}{3} + \dfrac{T_s}{U_d}\left(\dfrac{3}{2}U_{s\alpha} + \dfrac{\sqrt{3}}{6}U_{s\beta}\right)$ |
| | 4 | $\dfrac{T_s - T_2 - T_3}{2}$ | $\dfrac{T_s - T_2 - T_3}{2}$ | $\dfrac{T_s}{U_d}\left(\dfrac{3}{2}U_{s\alpha} + \dfrac{\sqrt{3}}{2}U_{s\beta}\right)$ | $-\dfrac{T_s}{3} - \dfrac{T_s}{U_d}\left(\dfrac{3}{2}U_{s\alpha} - \dfrac{\sqrt{3}}{6}U_{s\beta}\right)$ |
| III | 1 | $T_s - T_1 - T_2 - T_3$ | $T_3$ | $-\dfrac{T_s}{U_d}\left(\dfrac{3}{2}U_{s\alpha} + \dfrac{\sqrt{3}}{2}U_{s\beta}\right)$ | $\dfrac{T_s}{U_d}\left(\dfrac{1}{2}U_{s\alpha} + \dfrac{\sqrt{3}}{2}U_{s\beta}\right)$ |
| | 2 | $T_s - T_1 - T_2 - T_3$ | $T_3$ | $\dfrac{\sqrt{3}\,T_s U_{s\beta}}{U_d}$ | $-\dfrac{T_s}{U_d}\left(\dfrac{1}{2}U_{s\alpha} + \dfrac{\sqrt{3}}{2}U_{s\beta}\right)$ |
| | 3 | $\dfrac{T_s - T_2 - T_3}{2}$ | $\dfrac{T_s - T_2 - T_3}{2}$ | $-\dfrac{T_s}{U_d}\left(\dfrac{3}{2}U_{s\alpha} + \dfrac{\sqrt{3}}{2}U_{s\beta}\right)$ | $-\dfrac{T_s}{3} + \dfrac{T_s}{U_d}\left(\dfrac{1}{2}U_{s\alpha} + \dfrac{5\sqrt{3}}{6}U_{s\beta}\right)$ |
| | 4 | $\dfrac{T_s - T_2 - T_3}{2}$ | $\dfrac{T_s - T_2 - T_3}{2}$ | $\dfrac{\sqrt{3}\,T_s U_{s\beta}}{U_d}$ | $-\dfrac{T_s}{3} - \dfrac{T_s}{U_d}\left(U_{s\alpha} + \dfrac{2}{\sqrt{3}}U_{s\beta}\right)$ |
| IV | 1 | $T_s - T_1 - T_2 - T_3$ | $T_3$ | $-\dfrac{\sqrt{3}\,T_s U_{s\beta}}{U_d}$ | $\dfrac{T_s}{U_d}\left(-\dfrac{1}{2}U_{s\alpha} + \dfrac{\sqrt{3}}{2}U_{s\beta}\right)$ |
| | 2 | $T_s - T_1 - T_2 - T_3$ | $T_3$ | $-\dfrac{T_s}{U_d}\left(\dfrac{3}{2}U_{s\alpha} - \dfrac{\sqrt{3}}{2}U_{s\beta}\right)$ | $\dfrac{T_s}{U_d}\left(\dfrac{1}{2}U_{s\alpha} - \dfrac{\sqrt{3}}{2}U_{s\beta}\right)$ |
| | 3 | $\dfrac{T_s - T_2 - T_3}{2}$ | $\dfrac{T_s - T_2 - T_3}{2}$ | $-\dfrac{\sqrt{3}\,T_s U_{s\beta}}{U_d}$ | $-\dfrac{T_s}{3} - \dfrac{T_s}{U_d}\left(U_{s\alpha} - \dfrac{2}{\sqrt{3}}U_{s\beta}\right)$ |
| | 4 | $\dfrac{T_s - T_2 - T_3}{2}$ | $\dfrac{T_s - T_2 - T_3}{2}$ | $-\dfrac{T_s}{U_d}\left(\dfrac{3}{2}U_{s\alpha} - \dfrac{\sqrt{3}}{2}U_{s\beta}\right)$ | $-\dfrac{T_s}{3} + \dfrac{T_s}{U_d}\left(\dfrac{1}{2}U_{s\alpha} - \dfrac{5\sqrt{3}}{6}U_{s\beta}\right)$ |
| V | 1 | $T_s - T_1 - T_2 - T_3$ | $T_3$ | $\dfrac{T_s}{U_d}\left(\dfrac{3}{2}U_{s\alpha} - \dfrac{\sqrt{3}}{2}U_{s\beta}\right)$ | $-\dfrac{T_s U_{s\alpha}}{U_d}$ |
| | 2 | $T_s - T_1 - T_2 - T_3$ | $T_3$ | $-\dfrac{T_s}{U_d}\left(\dfrac{3}{2}U_{s\alpha} + \dfrac{\sqrt{3}}{2}U_{s\beta}\right)$ | $\dfrac{T_s U_{s\alpha}}{U_d}$ |
| | 3 | $\dfrac{T_s - T_2 - T_3}{2}$ | $\dfrac{T_s - T_2 - T_3}{2}$ | $\dfrac{T_s}{U_d}\left(\dfrac{3}{2}U_{s\alpha} - \dfrac{\sqrt{3}}{2}U_{s\beta}\right)$ | $-\dfrac{T_s}{3} - \dfrac{T_s}{U_d}\left(\dfrac{3}{2}U_{s\alpha} + \dfrac{\sqrt{3}}{6}U_{s\beta}\right)$ |
| | 4 | $\dfrac{T_s - T_2 - T_3}{2}$ | $\dfrac{T_s - T_2 - T_3}{2}$ | $-\dfrac{T_s}{U_d}\left(\dfrac{3}{2}U_{s\alpha} + \dfrac{\sqrt{3}}{2}U_{s\beta}\right)$ | $-\dfrac{T_s}{3} + \dfrac{T_s}{U_d}\left(\dfrac{3}{2}U_{s\alpha} - \dfrac{\sqrt{3}}{6}U_{s\beta}\right)$ |

TABLE 5-continued

| Sector | | $T_0$ | $T_1$ | $T_2$ | $T_3$ |
|---|---|---|---|---|---|
| VI | 1 | $T_s - T_1 - T_2 - T_3$ | $T_3$ | $-\frac{T_s}{U_d}\left(\frac{3}{2}U_{s\alpha} + \frac{\sqrt{3}}{2}U_{s\beta}\right)$ | $-\frac{T_s}{U_d}\left(\frac{1}{2}U_{s\alpha} + \frac{\sqrt{3}}{2}U_{s\beta}\right)$ |
| | 2 | $T_s - T_1 - T_2 - T_3$ | $T_3$ | $-\frac{\sqrt{3}\,T_s U_{s\beta}}{U_d}$ | $\frac{T_s}{U_d}\left(\frac{1}{2}U_{s\alpha} + \frac{\sqrt{3}}{2}U_{s\beta}\right)$ |
| | 3 | $\frac{T_s - T_2 - T_3}{2}$ | $\frac{T_s - T_2 - T_3}{2}$ | $\frac{T_s}{U_d}\left(\frac{3}{2}U_{s\alpha} + \frac{\sqrt{3}}{2}U_{s\beta}\right)$ | $-\frac{T_s}{3} - \frac{T_s}{U_d}\left(\frac{1}{2}U_{s\alpha} + \frac{5\sqrt{3}}{6}U_{s\beta}\right)$ |
| | 4 | $\frac{T_s - T_2 - T_3}{2}$ | $\frac{T_s - T_2 - T_3}{2}$ | $-\frac{\sqrt{3}\,T_s U_{s\beta}}{U_d}$ | $-\frac{T_s}{3} + \frac{T_s}{U_d}\left(U_{s\alpha} + \frac{2}{\sqrt{3}}U_{s\beta}\right)$ |

Similarly, the action time of the space voltage vectors in all sectors can be calculated based on the above schemes 2 and 3 respectively, such that, as long as the sector in which the reference voltage vector $\vec{U}_s$ is located is determined, the action time of the corresponding space voltage vectors may be obtained, which are not repeatedly discussed here.

In step 5, action orders of the zero vector $\vec{U}_0$, the small vector $\vec{U}_1$, the medium vector $U'_2$ and the large vector $U'_3$ are allocated.

As an embodiment, in the step 5, in each sampling period of the three power units 100, 200 and 300 in each stage 1000 of the cascaded three-phase VFD shown in FIG. 1, the zero vector $U'_0$ is used as an initial vector, and any one switching among the large vector $\vec{U}_3$, the medium vector $\vec{U}_2$, the small vector $\vec{U}_1$ and the zero vector $\vec{U}_0$ causes the state of the switches of only one of the output bridge arms Sa1, Sa2, Sb1, Sb2, Sc1 and Sc2 to be changed.

The above scheme 1 for allocating action time of the space voltage vectors is taken as an example, then the action orders of the space voltage vectors in each sector is shown in Table 6.

TABLE 6

| Sector | | Action orders of the space voltage vectors (represented by the switch states of the bridge arms) |
|---|---|---|
| I | 1 | 00 00 00, 10 00 00, 10 00 01, 10 01 01, 10 11 01, 10 11 11, 11 11 11, 10 11 11, 10 11 01, 10 01 01, 10 00 01, 10 00 00, 00 00 00 |
| | 2 | 00 00 00, 00 00 01, 10 00 01, 10 10 01, 10 11 01, 11 11 01, 11 11 11, 11 11 01, 10 11 01, 10 10 01, 10 00 01, 00 00 01, 00 00 00 |
| | 3 | 00 00 00, 10 00 00, 10 00 01, 10 01 01, 10 11 01, 10 11 11, 11 11 11, 10 11 11, 10 11 01, 10 01 01, 10 00 01, 10 00 00, 00 00 00 |
| | 4 | 00 00 00, 00 00 01, 10 00 01, 10 10 01, 10 11 01, 11 11 01, 11 11 11 11 11 01, 10 11 01, 10 10 01, 10 00 01, 00 00 01, 00 00 00 |
| II | 1 | 00 00 00, 00 00 01, 00 10 01, 10 10 01, 11 10 01, 11 11 01, 11 11 11, 11 11 01, 11 10 01, 10 10 01, 00 10 01, 00 00 01, 00 00 00 |
| | 2 | 00 00 00, 00 10 00, 00 10 01, 01 10 01, 11 10 01, 11 10 11, 11 11 11 11 10 11, 11 10 01, 01 10 01, 00 10 01, 00 10 00, 00 00 00 |
| | 3 | 00 00 00, 00 00 01, 00 10 01, 10 10 01, 11 10 01, 11 11 01, 11 11 11, 11 11 01, 11 10 01, 10 10 01, 00 10 01, 00 00 01, 00 00 00 |
| | 4 | 00 00 00, 00 10 00, 00 10 01, 01 10 01, 11 10 01, 11 10 11, 11 11 11, 11 10 11, 11 10 01, 01 10 01, 00 10 01, 00 10 00, 00 00 00 |
| III | 1 | 00 00 00, 00 10 00, 01 10 00, 01 10 01, 01 10 11, 11 10 11, 11 11 11, 11 10 11, 01 10 11, 01 10 01, 01 10 00, 00 10 00, 00 00 00 |
| | 2 | 00 00 00, 01 00 00, 01 10 00, 01 10 10, 01 10 11, 01 11 11, 11 11 11, 01 11 11, 01 10 11, 01 10 10, 01 10 00, 01 00 00, 00 00 00 |
| | 3 | 00 00 00, 00 10 00, 01 10 00, 01 10 01, 01 10 11, 11 10 11, 11 11 11, 11 10 11, 01 10 11, 01 10 01, 01 10 00, 00 10 00, 00 00 00 |
| | 4 | 00 00 00, 01 00 00, 01 10 00, 01 10 10, 01 10 11, 01 11 11, 11 11 11, 01 11 11, 01 10 11, 01 10 10, 01 10 00, 01 00 00, 00 00 00 |
| IV | 1 | 00 00 00, 01 00 00, 01 00 10, 01 10 10, 01 11 10, 01 11 11, 11 11 11, 01 11 11, 01 11 10, 01 10 10, 01 00 10, 01 00 00, 00 00 00 |
| | 2 | 00 00 00, 00 00 10, 01 00 10, 01 01 10, 01 11 10, 11 11 10, 11 11 11, 11 11 10, 01 11 10, 01 01 10, 01 00 10, 00 00 10, 00 00 00 |
| | 3 | 00 00 00, 01 00 00, 01 00 10, 01 10 10, 01 11 10, 01 11 11, 11 11 11, 01 11 11, 01 11 10, 01 10 10, 01 00 10, 01 00 00, 00 00 00 |
| | 4 | 00 00 00, 00 00 10, 01 00 10, 01 01 10, 01 11 10, 11 11 10, 11 11 11 11 11 10, 01 11 10, 01 01 10, 01 00 10, 00 00 10, 00 00 00 |
| V | 1 | 00 00 00, 00 00 10, 00 01 10, 01 01 10, 11 01 10, 11 11 10, 11 11 11, 11 11 10, 11 01 10, 01 01 10, 00 01 10, 00 00 10, 00 00 00 |
| | 2 | 00 00 00, 00 01 00, 00 01 10, 10 01 10, 11 01 10, 11 01 11, 11 11 11, 11 01 11, 11 01 10, 10 01 10, 00 01 10, 00 01 00, 00 00 00 |
| | 3 | 00 00 00, 00 00 10, 00 01 10, 01 01 10, 11 01 10, 11 11 10, 11 11 11, 11 11 10, 11 01 10, 01 01 10, 00 01 10, 00 00 10, 00 00 00 |

TABLE 6-continued

| Sector | | Action orders of the space voltage vectors (represented by the switch states of the bridge arms) |
|---|---|---|
| | 4 | 00 00 00, 00 01 00, 00 01 10, 10 01 10, 11 01 10, 11 01 11, 11 11 11, 11 01 11, 11 01 10, 10 01 10, 00 01 10, 00 01 00, 00 00 00 |
| VI | 1 | 00 00 00, 00 01 00, 10 01 00, 10 01 10, 10 01 11, 11 01 11, 11 11 11, 11 01 11, 10 01 11, 10 01 10, 10 01 00, 00 01 00, 00 00 00 |
| | 2 | 00 00 00, 10 00 00, 10 01 00, 10 01 01, 10 01 11, 10 11 11, 11 11 11, 10 11 11, 10 01 11, 10 01 01, 10 01 00, 10 00 00, 00 00 00 |
| | 3 | 00 00 00, 00 01 00, 10 01 00, 10 01 10, 10 01 11, 11 01 11, 11 11 11, 11 01 11, 10 01 11, 10 01 10, 10 01 00, 00 01 00, 00 00 00 |
| | 4 | 00 00 00, 10 00 00, 10 01 00, 10 01 01, 10 01 11, 10 11 11, 11 11 11, 10 11 11, 10 01 11, 10 01 01, 10 01 00, 10 00 00, 00 00 00 |

Similarly, the action orders of the space voltage vectors in all sectors can be calculated based on the above schemes 2 and 3 respectively, which are not repeatedly discussed here.

In step 6, a three-phase modulated wave signal is generated based on the action orders and the action time of the large vector $\vec{U}_3$, the medium vector $\vec{U}_2$, the small vector $\vec{U}_1$ and the zero vector $\vec{U}_0$ in the group.

Figure 6:
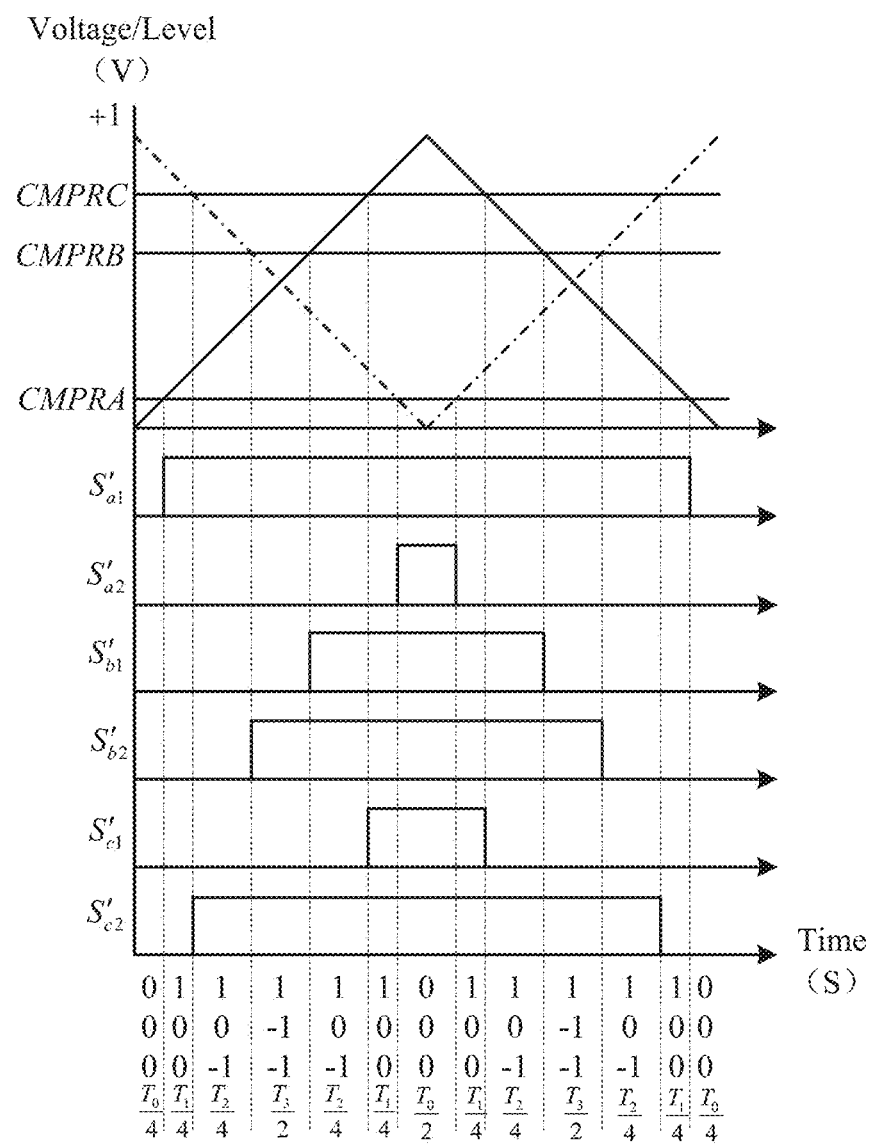
FIG. 6 is a schematic diagram illustrating correspondence relationship between the action time of space voltage vectors for synthesizing a reference voltage vector of the present disclosure and the states of the switches of a cascaded three-phase VFD.

After the action time and action orders of the space voltage vectors in each sector is calculated, the action time of the space voltage vectors is allocated to the switch state of the corresponding bridge arms. The above scheme 1 for allocating action time of the space voltage vectors and the reference voltage vector $U'_S$ located in the sector SI3 of the large sector SI are taken as an example. The corresponding relationship between the action time of the space voltage vectors and the corresponding switch states of the bridge arms is shown in FIG. 6. FIG. 6 is a schematic diagram illustrating correspondence relationship between the action time of the space voltage vectors for synthesizing the reference voltage vector of the present disclosure and the states of the switches of the cascaded three-phase VFD. As shown in FIG. 6, CMPRA, CMPRB, and CMPRC are loaded values of comparators, which correspond to switches of phase A, phase B and phase C, respectively. S'a1, S'a2, S'b1, S'b2, S'c1 and S'c2 represent switch states of the bridge arms Sa1, Sa2, Sb1, Sb2, Sc1 and Sc2, respectively. The horizontal axis represents time (S) and the vertical axis represents voltage or level (V or logic value). The switch states of the bridge arms correspond to the states of all of the switches, so allocating the action time of the space voltage vectors to the switch states of the corresponding bridge arms means allocating the on/off time of the switches to the corresponding switches, so as to fulfill the control of the switches.

The above scheme 1 for allocating action time to space voltage vectors and the reference voltage vector $\vec{U}_S$ located in the sector SI3 in the large sector SI are taken as an example, then, in order to ensure the duration time of the respective space voltage vectors, the loaded values of the comparators corresponding to the switches of phase A, phase B and phase C can be calculated according to the following formulae, wherein the loaded values of the comparator represent the conduction time of the corresponding arms (or switches).

$$\begin{cases} CMPRA = \dfrac{T_0}{2} \\ CMPRB = \dfrac{T_0}{2} + \dfrac{T_1}{2} + \dfrac{T_2}{2} + T_3 \\ CMPRC = \dfrac{T_0}{2} + \dfrac{T_1}{2} + T_2 + T_3 \end{cases}$$

The above scheme 1 for allocating action time of the space voltage vectors is taken as an example, and then the loaded values of the comparators in each sector are shown in Table 7.

TABLE 7

| | | Loaded values of the comparators | | |
|---|---|---|---|---|
| Sector | | CMPRA | CMPRB | CMPRC |
| I | 1 | $\dfrac{T_0}{2}$ | $\dfrac{T_0}{2} + \dfrac{T_1}{2} + \dfrac{T_2}{2} + T_3$ | $\dfrac{T_0}{2} + \dfrac{T_1}{2} + T_2 + T_3$ |
| | 2 | $\dfrac{T_0}{2} + \dfrac{T_1}{2}$ | $\dfrac{T_0}{2} + \dfrac{T_1}{2} + \dfrac{T_2}{2}$ | $T_s - \dfrac{T_0}{2}$ |
| | 3 | $\dfrac{T_0}{2}$ | $\dfrac{T_0}{2} + \dfrac{T_1}{2} + \dfrac{T_2}{2} + T_3$ | $\dfrac{T_0}{2} + \dfrac{T_1}{2} + T_2 + T_3$ |
| | 4 | $\dfrac{T_0}{2} + \dfrac{T_1}{2}$ | $\dfrac{T_0}{2} + \dfrac{T_1}{2} + \dfrac{T_2}{2}$ | $T_s - \dfrac{T_0}{2}$ |
| II | 1 | $\dfrac{T_0}{2} + \dfrac{T_1}{2} + \dfrac{T_2}{2}$ | $\dfrac{T_0}{2} + \dfrac{T_1}{2}$ | $T_s - \dfrac{T_0}{2}$ |
| | 2 | $\dfrac{T_0}{2} + \dfrac{T_1}{2} + \dfrac{T_2}{2} + T_3$ | $\dfrac{T_0}{2}$ | $\dfrac{T_0}{2} + \dfrac{T_1}{2} + T_2 + T_3$ |

TABLE 7-continued

| | | Loaded values of the comparators | | |
|---|---|---|---|---|
| Sector | | CMPRA | CMPRB | CMPRC |
| | 3 | $\frac{T_0}{2}+\frac{T_1}{2}+\frac{T_2}{2}$ | $\frac{T_0}{2}+\frac{T_1}{2}$ | $T_s-\frac{T_0}{2}$ |
| | 4 | $\frac{T_0}{2}+\frac{T_1}{2}+\frac{T_2}{2}+T_3$ | $\frac{T_0}{2}$ | $\frac{T_0}{2}+\frac{T_1}{2}+T_2+T_3$ |
| III | 1 | $\frac{T_0}{2}+\frac{T_1}{2}+T_2+T_3$ | $\frac{T_0}{2}$ | $\frac{T_0}{2}+\frac{T_1}{2}+\frac{T_2}{2}+T_3$ |
| | 2 | $T_s-\frac{T_0}{2}$ | $\frac{T_0}{2}+\frac{T_1}{2}$ | $\frac{T_0}{2}+\frac{T_1}{2}+\frac{T_2}{2}$ |
| | 3 | $\frac{T_0}{2}+\frac{T_1}{2}+T_2+T_3$ | $\frac{T_0}{2}$ | $\frac{T_0}{2}+\frac{T_1}{2}+\frac{T_2}{2}+T_3$ |
| | 4 | $T_s-\frac{T_0}{2}$ | $\frac{T_0}{2}+\frac{T_1}{2}$ | $\frac{T_0}{2}+\frac{T_1}{2}+\frac{T_2}{2}$ |
| IV | 1 | $T_s-\frac{T_0}{2}$ | $\frac{T_0}{2}+\frac{T_1}{2}+\frac{T_2}{2}$ | $\frac{T_0}{2}+\frac{T_1}{2}$ |
| | 2 | $\frac{T_0}{2}+\frac{T_1}{2}+T_2+T_3$ | $\frac{T_0}{2}+\frac{T_1}{2}+\frac{T_2}{2}+T_3$ | $\frac{T_0}{2}$ |
| | 3 | $T_s-\frac{T_0}{2}$ | $\frac{T_0}{2}+\frac{T_1}{2}+\frac{T_2}{2}$ | $\frac{T_0}{2}+\frac{T_1}{2}$ |
| | 4 | $\frac{T_0}{2}+\frac{T_1}{2}+T_2+T_3$ | $\frac{T_0}{2}+\frac{T_1}{2}+\frac{T_2}{2}+T_3$ | $\frac{T_0}{2}$ |
| V | 1 | $\frac{T_0}{2}+\frac{T_1}{2}+\frac{T_2}{2}+T_3$ | $\frac{T_0}{2}+\frac{T_1}{2}+T_2+T_3$ | $\frac{T_0}{2}$ |
| | 2 | $\frac{T_0}{2}+\frac{T_1}{2}+\frac{T_2}{2}$ | $T_s-\frac{T_0}{2}$ | $\frac{T_0}{2}+\frac{T_1}{2}$ |
| | 3 | $\frac{T_0}{2}+\frac{T_1}{2}+\frac{T_2}{2}+T_3$ | $\frac{T_0}{2}+\frac{T_1}{2}+T_2+T_3$ | $\frac{T_0}{2}$ |
| | 4 | $\frac{T_0}{2}+\frac{T_1}{2}+\frac{T_2}{2}$ | $T_s-\frac{T_0}{2}$ | $\frac{T_0}{2}+\frac{T_1}{2}$ |
| VI | 1 | $\frac{T_0}{2}+\frac{T_1}{2}$ | $T_s-\frac{T_0}{2}$ | $\frac{T_0}{2}+\frac{T_1}{2}+\frac{T_2}{2}$ |
| | 2 | $\frac{T_0}{2}$ | $\frac{T_0}{2}+\frac{T_1}{2}+T_2+T_3$ | $\frac{T_0}{2}+\frac{T_1}{2}+\frac{T_2}{2}+T_3$ |
| | 3 | $\frac{T_0}{2}+\frac{T_1}{2}$ | $T_s-\frac{T_0}{2}$ | $\frac{T_0}{2}+\frac{T_1}{2}+\frac{T_2}{2}$ |
| | 4 | $\frac{T_0}{2}$ | $\frac{T_0}{2}+\frac{T_1}{2}+T_2+T_3$ | $\frac{T_0}{2}+\frac{T_1}{2}+\frac{T_2}{2}+T_3$ |

Similarly, the loaded values of the comparators corresponding to the switches of respective phases in all sectors may be calculated based on the above schemes 2 and 3 respectively, which are not repeatedly discussed here.

Figure 7:
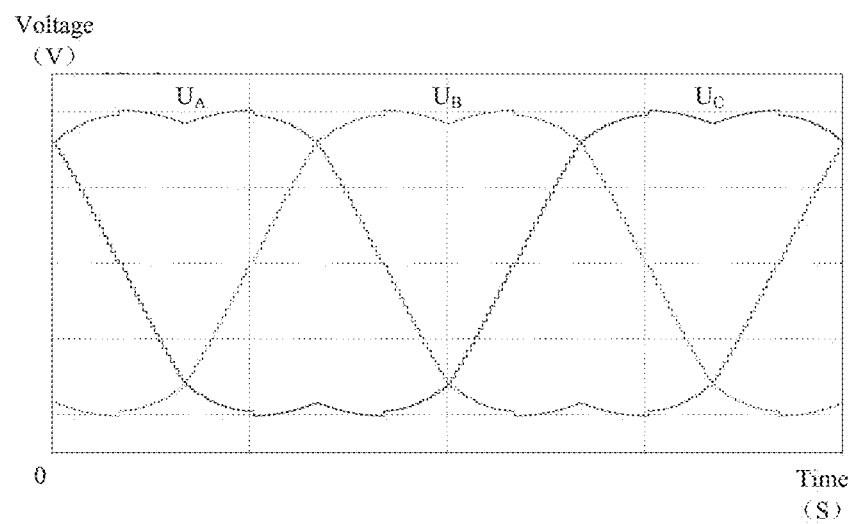
FIG. 7 is a waveform diagram illustrating a three-phase modulated wave according to an embodiment of the present disclosure.

FIG. 7 is a waveform diagram illustrating a three-phase modulated wave according to an embodiment of the present disclosure. As shown in FIG. 7, the horizontal coordinate axis is time (S), and the vertical coordinate axis is voltage (V). The three curves in the figure show the fundamental wave signals $U_A$, $U_B$ and $U_C$ of the three-phase modulated wave generated by the scheme 1 for allocating action time of the space voltage vectors.

Figure 8:
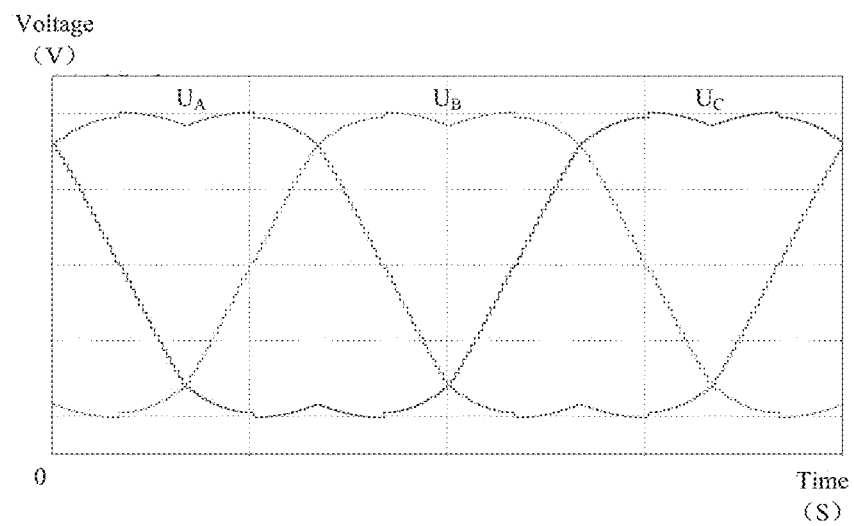
FIG. 8 is a waveform diagram illustrating a three-phase modulated wave according to another embodiment of the present disclosure.

FIG. 8 is a waveform diagram illustrating a three-phase modulated wave according to another embodiment of the present disclosure. As shown in FIG. 8, the horizontal coordinate axis is time (S), and the vertical coordinate axis is voltage (V). The three curves in the figure show the fundamental wave signals $U_A$, $U_B$ and $U_C$ of the three-phase modulated wave generated by the scheme 2 for allocating action time of the space voltage vectors.

Figure 9:
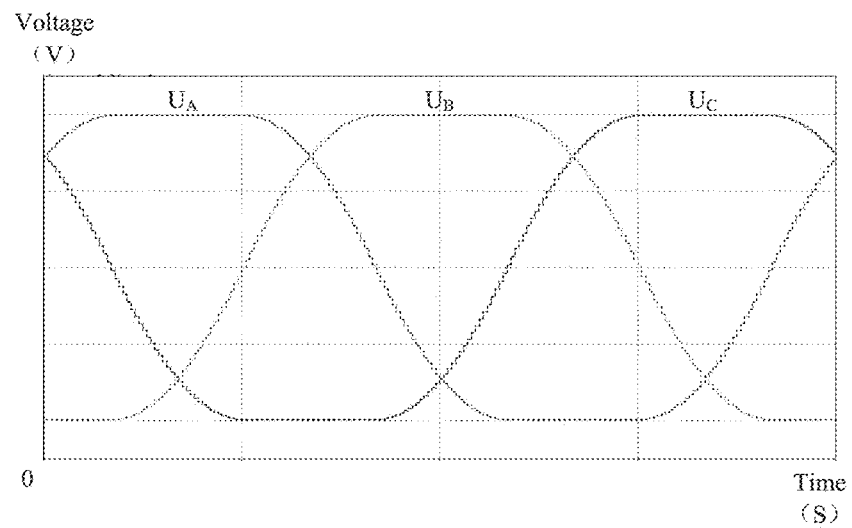
FIG. 9 is a waveform diagram illustrating a three-phase modulated wave according to still another embodiment of the present disclosure.

FIG. 9 is a waveform diagram illustrating a three-phase modulated wave according to still another embodiment of the present disclosure. As shown in FIG. 9, the horizontal coordinate axis is time (S), and the vertical coordinate axis is voltage (V). The three curves in the figure show the fundamental wave signals $U_A$, $U_B$ and $U_C$ of the three-phase modulated wave generated by the scheme 3 for allocating action time of the space voltage vectors.

In step 7, switching signals of the power units 100, 200 and 300 in the stage 1000 are generated according to the generated three-phase modulated wave signals as shown in FIG. 7, FIG. 8, or FIG. 9, i.e., the fundamental wave signals $U_A$, $U_B$ and $U_C$, which are known in the art, so it is not repeatedly described here.

When the present disclosure is applied to a cascade three-phase VFD with 6 stages, the technical effects of the present disclosure are compared with the prior art as follows.

Figure 10:
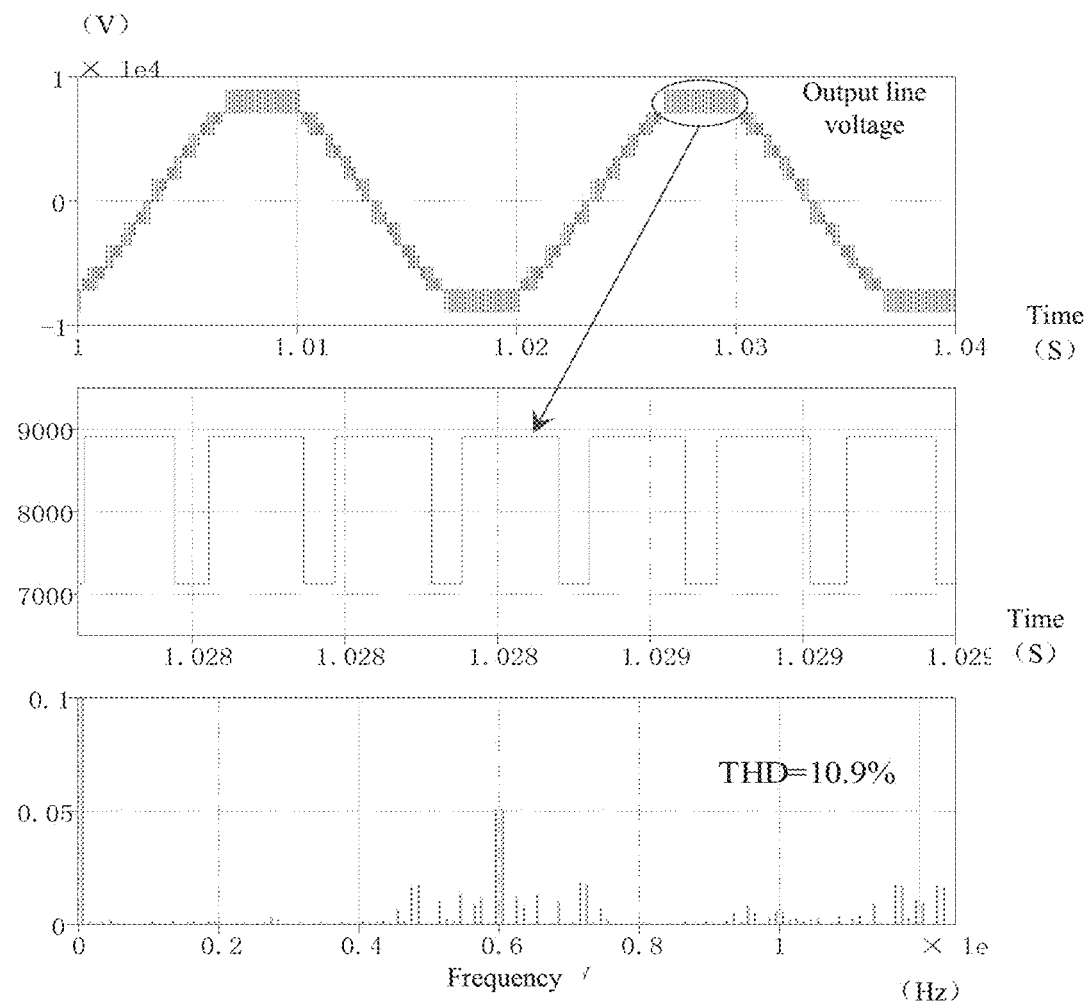
FIG. 10 is a waveform and spectrogram diagram illustrating an output line voltage when using saddle-shaped modulated wave in unipolar frequency doubling carrier phase shift modulation according to the related art.

FIG. 10 is a waveform and spectrogram diagram illustrating an output line voltage when using saddle-shaped modulated wave in unipolar frequency doubling carrier phase shift modulation in the prior art. As shown in FIG. 10, the horizontal axis of the waveform at the top is time (S), the vertical axis is voltages (V), and the waveform of the output line voltage when adopting the conventional saddle-shaped modulated wave and the unipolar frequency doubling carrier phase shift modulation is shown. The waveform diagram in the middle is a partial enlarged view of the waveform diagram located at the top. The horizontal coordinate axis of the spectrogram located at the bottom is frequency (Hz), and the vertical coordinate axis is relative amplitudes, which is the result of the fast Fourier transformation (FFT) of the waveform diagram located at the top. Its total harmonic distortion (THD) is 10.9%.

Figure 11:
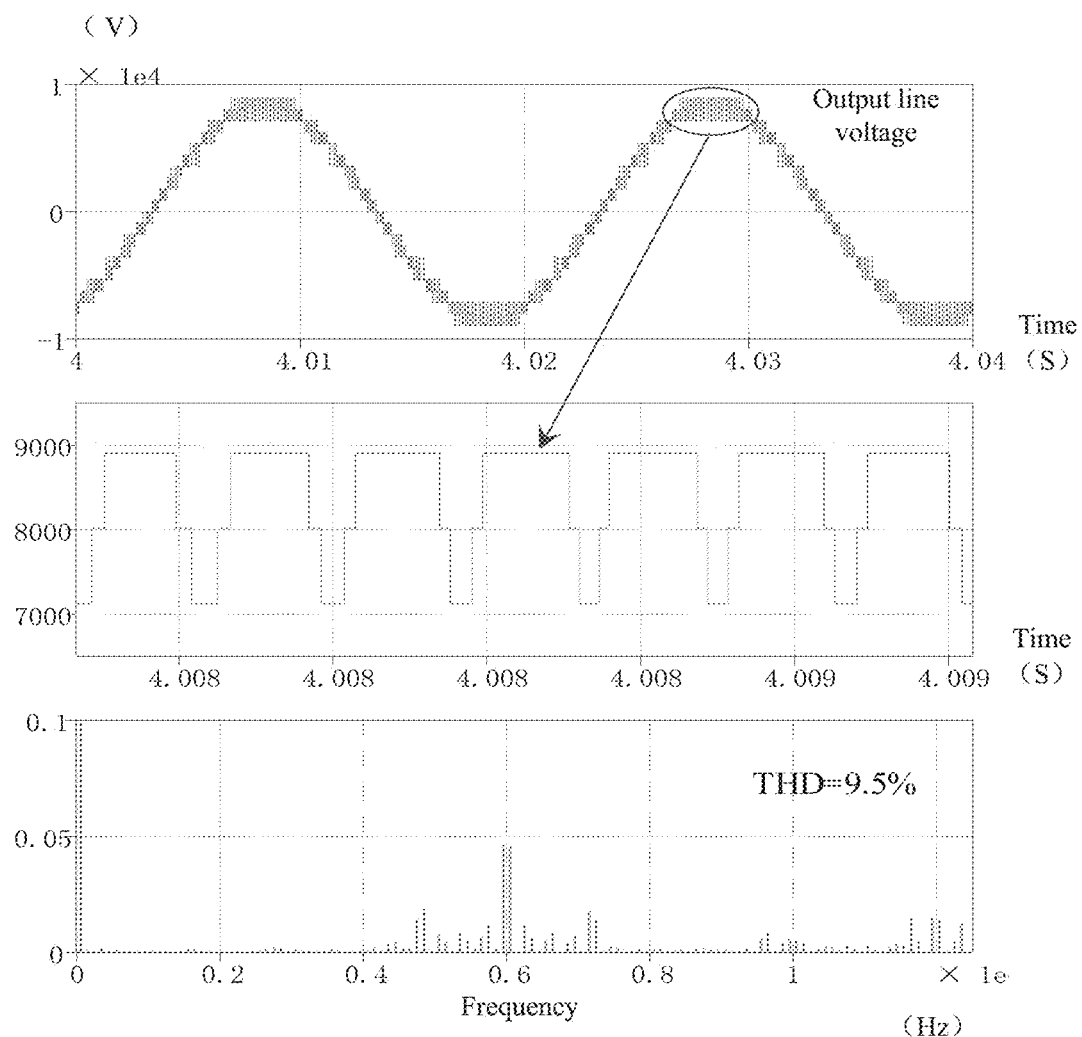
FIG. 11 is a waveform and spectrogram diagram illustrating an output line voltage when using a method of modulating a cascaded three-phase VFD according to the present disclosure.

FIG. 11 is a waveform and spectrogram diagram illustrating an output line voltage when using a method of modulating a cascaded three-phase VFD according to the present disclosure. As shown in FIG. 11, the horizontal axis of the waveform at the top is time (S), the vertical axis is voltages (V), and the waveform of the output line voltage when adopting the method of modulating a cascaded three-phase VFD of the present disclosure is shown. The waveform diagram in the middle is a partial enlarged view of the waveform diagram located at the top. The horizontal coordinate axis of the spectrogram located at the bottom is frequency (Hz), and the vertical coordinate axis is relative amplitudes, which is the result of the fast Fourier transformation (FFT) of the waveform diagram located at the top. Its total harmonic distortion (THD) is 9.5%, which shows that the waveform of the sine wave is improved.

Referring to the FIG. 10 and FIG. 11, it can be seen that, when the method of modulating a cascaded three-phase VFD of the present disclosure is adopted, a voltage of double level jump no longer appears at the peak of the line voltage output by the system, and the total harmonic distortion is reduced. When the system is connected by a long cable to a motor, the disclosure can reduce the overvoltage on the motor end caused by the cable distribution parameter, thereby better protecting the insulation of the motor and prolonging the life of the motor.

The present disclosure has been described by the above related embodiments, but the above embodiments are merely examples for implementing the present disclosure. It must be noted that the disclosed embodiments do not limit the scope of the present disclosure. Conversely, any modification and refinement made without departing from the spirit and scope of the present disclosure falls within the patent protection scope of the present disclosure.

What is claimed is:

1. A method of modulating a cascaded three-phase VFD, wherein each stage of the cascaded three-phase converter comprises three power units, to provide corresponding output voltages of phase A, phase B and phase C, and the method comprises:

in step 1: obtaining a plurality of space voltage vectors according to states of switches and output levels of the power units in the stage, and dividing the plurality of space voltage vectors into large vectors, medium vectors, small vectors and zero vectors according to lengths of the plurality of space voltage vectors;

in step 2, arranging the plurality of space voltage vectors into a vector space, and dividing the vector space into a plurality of sectors by the plurality of space voltage vectors, wherein each of the sectors corresponds to a group consisting of the large vector, the medium vector, the small vector and the zero vector;

in step 3, determining a sector in which a reference voltage vector is located, wherein the reference voltage vector is composed by the group consisting of the large vector, the medium vector, the small vector and the zero vector, corresponding to the sector;

in step 4, in one switching period, respectively calculating action time of the vectors in the group;

in step 5, allocating an action order to the zero vector, the small vector, the medium vector and the large vector;

in step 6, generating a three-phase modulated wave signal based on the action order and the action time of the vectors in the group; and in step 7, generating switching signals for the power units in the stage according to the generated three-phase modulated wave signals.

2. The method of modulating a cascaded three-phase VFD of claim 1, wherein, in the step 1, the power units in each stage have 64 of the states of the switches and 27 of the space voltage vectors.

3. The method of modulating a cascaded three-phase VFD of claim 2, wherein, in the step 1, the 27 space voltage vectors are divided into 6 of the large vectors each having a length of $4/3 U_{dc}$, 6 of the medium vectors each having a length of $$\frac{2\sqrt{3}}{3} U_{dc},$$

12 of the small vectors each having a length of $2/3 U_{dc}$, and 3 of the zero vectors each having a length of 0, wherein the $U_{dc}$ is a DC bus voltage of the power units.

4. The method of modulating a cascaded three-phase VFD of claim 2, wherein, in the step 2, the 27 space voltage vectors divide the vector space into 24 of the sectors, and the vector space is composed of a first hexagon and a second hexagon which are overlapped.

5. The method of modulating a cascaded three-phase VFD of claim 4, wherein, in the step 2, the large vectors respectively point to six apexes of the first hexagon, the middle vectors respectively point to midpoints of six sides of the first hexagon, and the small vectors point to six apexes of the second hexagon, wherein the large vectors divide the first hexagon into six large sectors, and the corresponding medium vectors and the corresponding small vectors divide each large sector into four sectors.

6. The method of modulating a cascaded three-phase VFD of claim 5, wherein, in the step 4, in any sector, a formula for synthesizing the reference voltage vector is:

$$\vec{U}_s = \frac{T_0}{T_s}\vec{U}_0 + \frac{T_1}{T_s}\vec{U}_1 + \frac{T_2}{T_s}\vec{U}_2 + \frac{T_3}{T_s}\vec{U}_3, \quad (1)$$

wherein, $\vec{U}_S$ is the reference voltage vector, $\vec{U}_0$ is the zero vector in the group, $\vec{U}_1$ is the small vector in the group, $U'_2$ is the medium vector in the group, $\vec{U}_3$ is the large vector in the group, $T_S$ is the switching period of the power units, $T_0$ is the action time of the zero vector, and $T_1$ is the action time of the small vector, $T_2$ is the action time of the medium vector, and $T_3$ is the action time of the large vector, and
wherein the action time of the zero vector satisfies:

$$T_0 = T_S - T_1 - T_2 - T_3 \quad (2).$$

7. The method of modulating a cascaded three-phase VFD of claim 6, wherein, in the step 4, in any of the large sectors, in two of the sectors within the second hexagon, a constraint condition is set to be that the action time $T_1$ is equal to the action time $T_3$, and in two of the sectors outside the second hexagon, a constraint condition is set to be that the action time $T_1$ is equal to the action time $T_0$, and the action time $T_0$, $T_1$, $T_2$ and $T_3$ is obtained by calculating according to the sector in which the reference voltage vector is located, the formulae (1) and (2) and the constraint conditions.

8. The method of modulating a cascaded three-phase VFD of claim 6, wherein, in the step 4, in any of the sectors, a constraint condition is set to be that the action time $T_1$ is equal to the action time $T_0$, and the action time $T_0$, $T_1$, $T_2$ and $T_3$ is obtained by calculating according to the sector in which the reference voltage vector is located, the formulae (1) and (2) and the constraint condition.

9. The method of modulating a cascaded three-phase VFD of claim 6, wherein, in the step 4, in any of the sectors, a constraint condition is set to be $$T_0 = T_S\left(1 - \frac{\sqrt{3}}{2}\frac{U_{ref\_PK}}{U_{dc}}\right),$$

and the action time $T_0$, $T_1$, $T_2$ and $T_3$ is obtained by calculating according to the sector in which the reference voltage vector $U'_S$ is located, the formulae (1) and (2) and the constraint condition, wherein the $U_{ref\_PK}$ is a peak value of the reference voltage vector, and the $U_{dc}$ is a DC bus voltage of the power units.

10. The method of modulating a cascaded three-phase VFD of claim 1, wherein, in the step 5, in each sampling period, the zero vector is used as an initial vector, and any one switching among the large vector, the medium vector, the small vector and the zero vector causes the state of the switches of only one of the output bridge arms to be changed.

* * * * *